(12) United States Patent
Igawa (10) Patent No.: US 8,736,907 B2
(45) Date of Patent: May 27, 2014

(54) IMAGE PROCESSING APPARATUS, CONTROL METHOD, AND COMPUTER PROGRAM PRODUCT CAPABLE OF MINIMIZING CROSS-LINKAGE BETWEEN LINE SCREENS

(75) Inventor: Hiroyuki Igawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 231 days.

(21) Appl. No.: 13/295,693

(22) Filed: Nov. 14, 2011

(65) Prior Publication Data
US 2012/0120454 A1 May 17, 2012

(30) Foreign Application Priority Data
Nov. 17, 2010 (JP) ................................. 2010-257021

(51) Int. Cl.
*H04N 1/405* (2006.01)
*G06K 9/00* (2006.01)
*G03G 13/04* (2006.01)

(52) U.S. Cl.
USPC ....... 358/3.13; 358/3.14; 358/3.15; 358/3.17; 358/3.2; 358/3.06; 382/251; 382/252; 347/131; 347/184

(58) Field of Classification Search
None
See application file for complete search history.

(56) References Cited

U.S. PATENT DOCUMENTS 6,266,150 B1 *  7/2001  Brossman et al. ........... 358/1.15
6,512,598 B2 *  1/2003  Fujita et al. ................. 358/3.09
7,545,399 B2 *  6/2009  Inoue et al. .................. 347/131

FOREIGN PATENT DOCUMENTS

| CN | 1716115 A | 1/2006 |
| JP | 8-18787 | 1/1996 |
| JP | 9-326927 | 12/1997 |

OTHER PUBLICATIONS

Combined Office Action and Search Report issued Nov. 26, 2013 in Chinese Patent Application No. 201110352119.1 with English translation of categories of cited documents.

* cited by examiner

*Primary Examiner* — Steven Kau
(74) *Attorney, Agent, or Firm* — Oblon, Spivak, McClelland, Maier & Neustadt, L.L.P.

(57) ABSTRACT

An image processing apparatus comprises a dither processing device that applies dither processing to input image data to express halftone using line screens by increasing an area rate of the input image data and a controller that decreases the number of line screens and maintains a prescribed dropout width between the neighboring line screens when the area rate of the input image data increases and the dropout width falls below a prescribed level.

8 Claims, 6 Drawing Sheets

DROPOUT WIDTH BETWEEN PARALLEL LINES: 83 μm
100 μm

DROPOUT WIDTH BETWEEN PARALLEL LINES: 76 μm
100 μm

DROPOUT WIDTH BETWEEN PARALLEL LINES: 64 μm
100 μm

IMAGE PROCESSING APPARATUS, CONTROL METHOD, AND COMPUTER PROGRAM PRODUCT CAPABLE OF MINIMIZING CROSS-LINKAGE BETWEEN LINE SCREENS

CROSS-REFERENCE TO RELATED APPLICATIONS

This patent application is based on and claims priority pursuant to 35 U.S.C. §119 to Japanese Patent Application No. 2010-257021, filed on Nov. 17, 2010, the entire disclosure of which is hereby incorporated by reference herein.

FIELD OF THE INVENTION

The present invention relates to an image forming apparatus, such as a copier, a printer, a facsimile machine, or a multifunctional machine combining these devices, etc., a control method, and a computer program product capable of minimizing cross-linkage between line screens during a dither processing.

BACKGROUND OF THE INVENTION

Color stability of an electrophotographic image is inferior to that generated by offset printing, and accordingly there is market demand for improvement in this regard. In an electrophotographic image, a halftone is generally expressed by using a dither processing such as processing of screen of straight lines (i.e., line screens) or that of halftone dots. In particular, line screen processing is employed for its excellent toner attraction stability. In this type of processing, the number of line screens per unit length or area is varied with image density. However, hitherto the amount of toner attracted onto an image tends to fluctuate when the image has a high density, thereby degrading color stability. The end result is an inability to improve color density. Japanese Patent Application Publication No. 09-326927 (JP-H09-326927-A) discloses a technique of stabilizing generation of dithering dots having multiple levels and sizes while maintaining high image resolution when the image has a low area rate. However, JP-H09-326927-A simply stabilizes the dot size needed only when the image has a low area rate, and is silent as to minimizing fluctuation in the amount of toner attracted onto a high-area rate image. Consequently, a method capable of improving the color stability of high-area rate images continues to be sought.

BRIEF SUMMARY OF THE INVENTION

Accordingly, the present invention provides a novel image forming apparatus that comprises a dither processing device to apply dither processing to input image data using line screen processing. The dither processing device calculates a dropout width between neighboring line screens after execution of the line screen processing in accordance with an area rate of the input image data. The dither processing device decreases the number of line screens per unit area and maintains a prescribed minimum dropout width therebetween when the dropout width as a calculation result falls below a prescribed level.

In another aspect, the prescribed level of the dropout width is a minimum level capable of substantially avoiding cross-linkage of the line screens on an image.

In yet another aspect, the prescribed minimum level of the number of line screens representing a minimum image quality level.

In yet another aspect, an image formation device is provided to form an image on an image bearer by emitting a light beam thereonto in accordance with image data obtained by applying the dither processing to the input image data. A designating device is also provided to designate the prescribed minimum dropout width in accordance with one of a writing speed of the light beam and a spot diameter of the light beam.

In yet another aspect, the dither processing device stops decreasing the number of line screens at a prescribed lower limit.

In yet another aspect, the dither processing device decreases the number of line screens by one at a time.

In yet another aspect, the dither processing device recalculates the dropout width in accordance with the area rate of the input image data every time the number of line screens is decreased by one at a time.

In yet another aspect, a method of executing image data processing comprises the steps of: applying dither processing to input image data with line screen processing in accordance with an area rate of the input image data; calculating a dropout width between the neighboring line screens in accordance with the area rate of the input image data based on the line screen processing; decreasing the number of line screens per unit area to maintain a prescribed minimum dropout width between the neighboring line screens when the area rate of the input image data increases and the dropout width falls below a prescribed level; recalculating a dropout width between the neighboring line screens in accordance with the area rate of the input image data based on the line screen processing; and outputting an image signal having the lower limit number of line screens when the dropout width exceeds the prescribed level.

In yet another aspect, a computer program product comprising computer program codes that when executed by a computer causes the computer to perform the steps of: applying dither processing to input image data with line screen processing in accordance with an area rate of the input image data; calculating a dropout width between the neighboring line screens in accordance with the area rate of the input image data based on the line screen processing; decreasing the number of line screens per unit area to maintain a prescribed minimum dropout width between the neighboring line screens when the area rate of the input image data increases and the dropout width falls below a prescribed level; recalculating a dropout width between the neighboring line screens in accordance with the area rate of the input image data based on the line screen processing; and outputting an image signal having the lower limit number of line screens when the dropout width exceeds the prescribed level.

BRIEF DESCRIPTION OF THE DRAWINGS

A complete appreciation of the present invention and many of the attendant advantages thereof will be more readily obtained as the same becomes better understood by reference to the following detailed description when considered in connection with the accompanying drawings, wherein.

DETAILED DESCRIPTION OF THE INVENTION

Figure 1:
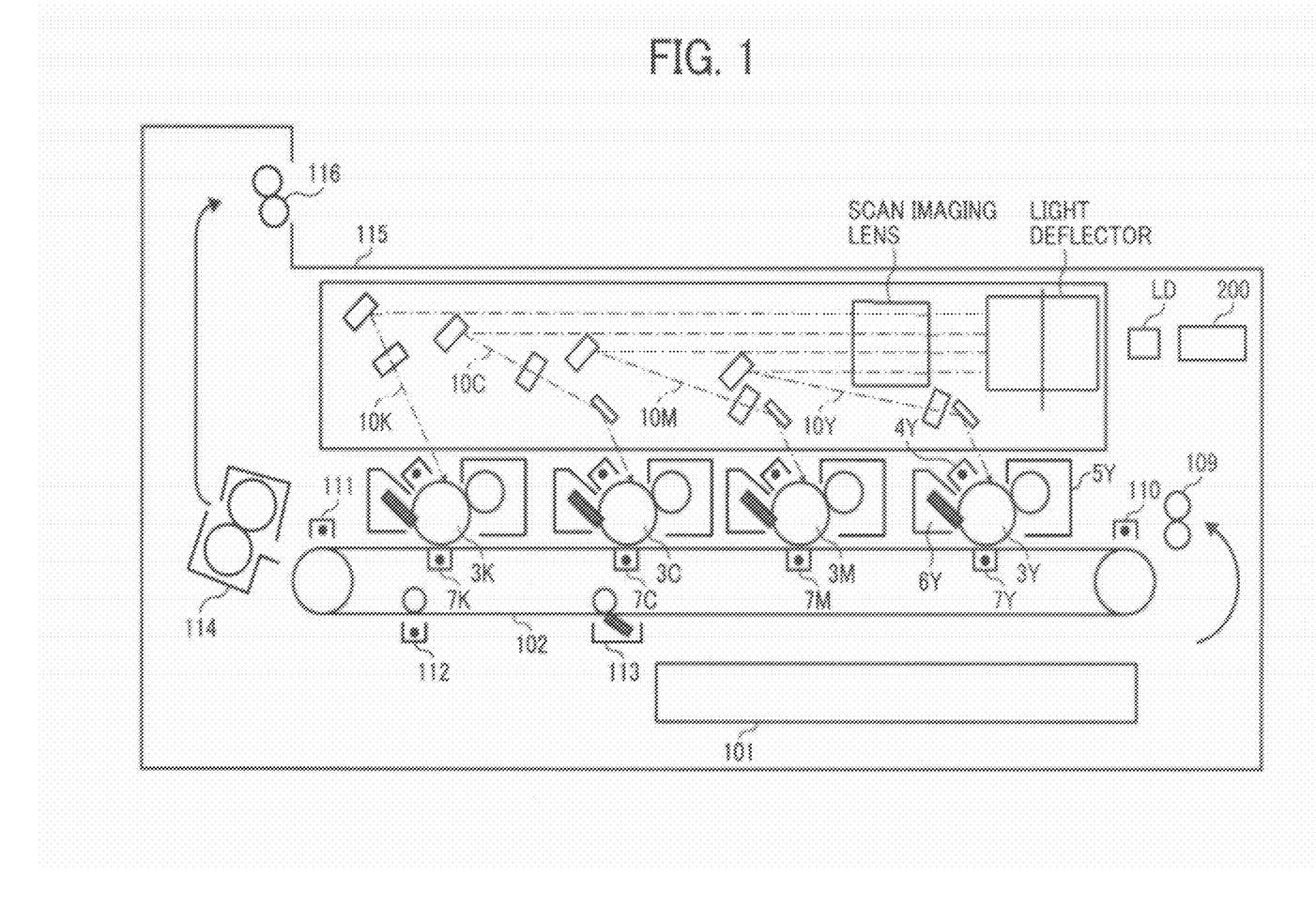
FIG. 1 schematically illustrates a typical image forming apparatus according to one embodiment of the present invention.
Figure 2:
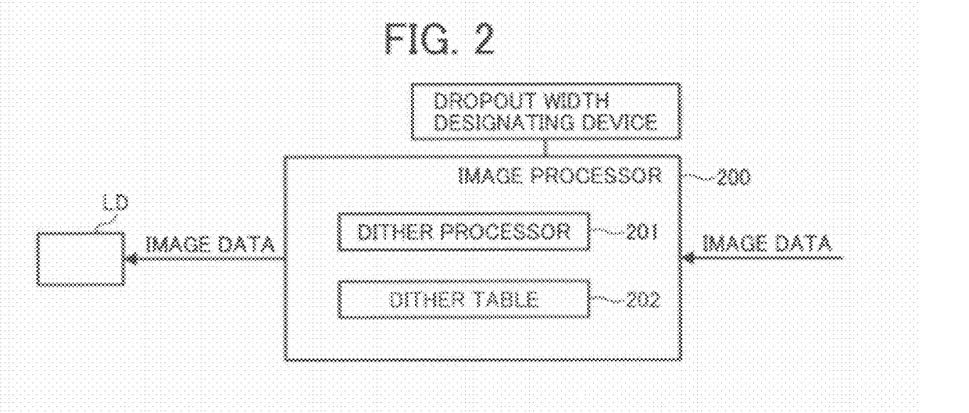
FIG. 2 illustrates a typical configuration of an image processing section 200 installed in an image forming apparatus according to one embodiment of the present invention.
Figure 6:
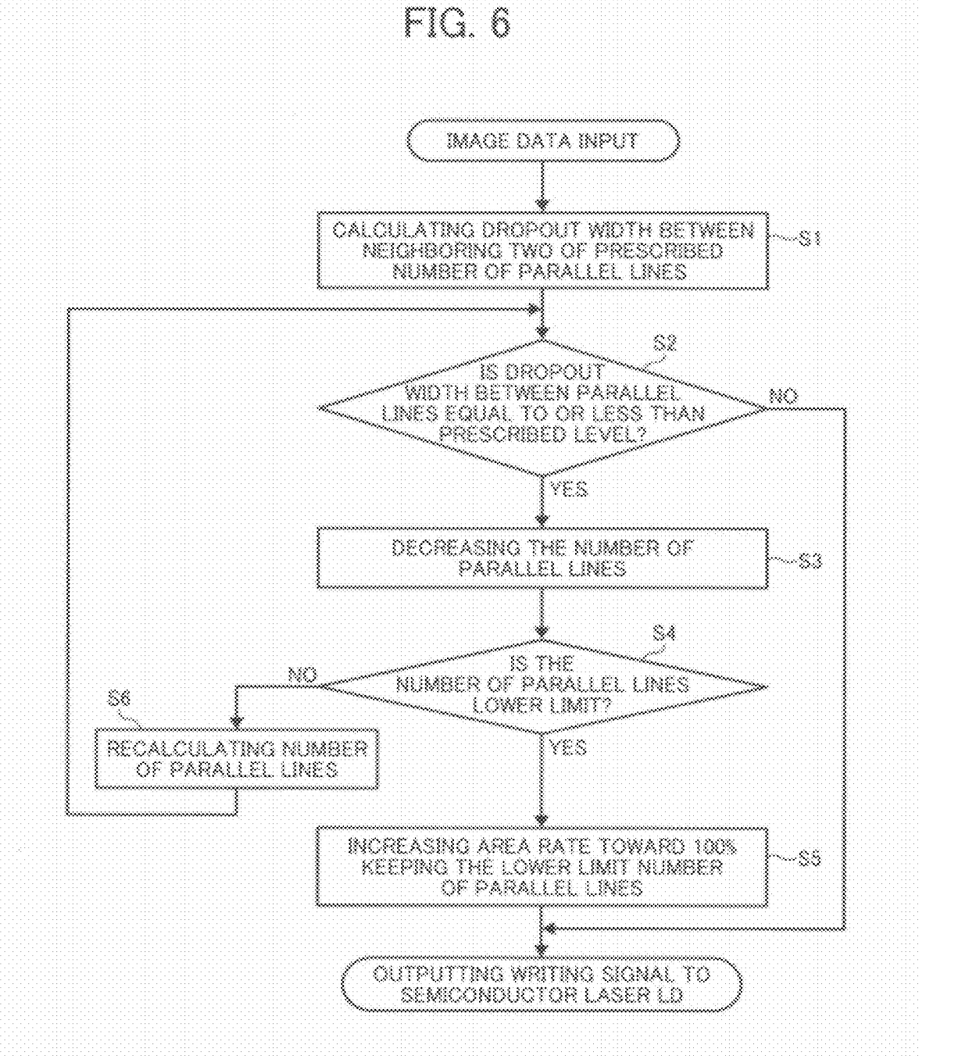
FIG. 6 illustrates a typical sequence of dither processing applied to input image data according to one embodiment of the present invention.

Referring now to the drawings, wherein like reference numerals designate identical or corresponding parts throughout the several views thereof, and in particular to FIGS. 1, 2, and 6, a typical image processing apparatus 200 of this embodiment is described. As shown in FIG. 1, the image processing section 200 is included in an image forming apparatus and applies dither processing to image data inputted thereto.

Specifically, as shown in FIG. 6, when a area rate of image data is increased in step S1, and a dropout width between line screens becomes equal to or less than a prescribed level as a result, the image processing apparatus 200 (e.g. a dither processing device) decreases the number of line screens per unit area (hereinafter, simply referred to as the number of line screens) to maintain a prescribed level or more of the dropout width in step S3.

By contrast, hitherto, an interval (i.e., a dropout width) between line screens is simply narrowed in reverse proportion to the area rate of the image data even it reaches a prescribed high level. However, when the dropout width becomes excessively narrow, the line screens partially contact each other, thereby generating cross-linkage of the line screens therebetween. As a result, since an amount of toner attracted (onto an image) fluctuates, the color of the image is not stabilized when the image has a high area rate.

Therefore, this embodiment maintains a dropout width greater than the prescribed level even when an area rate of image data increases to a high level. Under such control, fluctuation in the amount of toner attracted onto an image can be minimized, thereby improving color stability thereof. The image processing section 200 employed in the image forming apparatus is now described in detail with reference to FIG. 1. It is to be noted that the image processing section 200 is not limited to that shown in FIG. 1, and various image forming apparatuses which emit a light beam can employ the image processing section 200 as well as described below.

Initially, a typical image forming apparatus of this embodiment is briefly described with reference to FIG. 1.

As shown, the image forming apparatus includes a sheet feeding cassette 101 horizontally installed in a lower section thereof. A conveyance belt 102 is provided in the image forming apparatus to convey a transfer sheet fed from the sheet feeding cassette 101.

Above the conveyance belt 102, there are provided photoconductive drums 3Y, 3M, 3C, and 3K for bearing respective yellow, magenta, cyan, and black color images in this order at the prescribed same interval.

The photoconductive drums 3Y, 3M, 3C, and 3K each includes substantially the same diameter with each other and surrounded by various process members in a prescribed order to execute an electrophotograph process. For example, around the photoconductive drum 3Y, there are provided a charging module 4Y, an optical scanning system 10Y, a developing module 5Y, a transfer module 7Y, and a cleaning module 6Y in this order. The same provisions are disposed around each of the remaining photoconductive drums 3M, 3C, and 3K.

Thus, the photoconductive drums 3Y, 3M, 3C, and 3K have surfaces as scanning objective of the scanning optical systems 10Y, 10M, 10C, and 10K, respectively.

Further, around the conveyance belt 102, there are provided in an upstream of the photoconductive drum 3Y, a belt charger 110 and a registration roller 109 in this order. Those provided around the conveyance belt 102 at downstream of the photoconductive drum 3K are a belt separation charger 11, a charge remover 112, and a cleaner 113 in this order.

Further, a fixing device 114 and a pair of sheet ejection rollers 116 are provided downstream of the belt separation charger 111 for fixing a toner image and ejecting a sheet onto sheet ejection tray 115, respectively.

In the image forming apparatus of FIG. 1, when printing in a full-color mode (i.e., a multiple color mode), the image processing section 200 applies dither processing to image data transmitted from a host computer. Subsequently, a semiconductor laser diode (LD) is driven and emits a light beam toward a light deflector in accordance with image data having received the dither processing from the image processing section 200. Subsequently, the optical scanners 10Y, 10M, 10C, and 10K operate emitting the light beams and form latent images on the photoconductive drums 3Y, 3M, 3C, and 3K of corresponding colors in accordance with the image data, respectively. The latent images on the photoconductive drums 3Y, 3M, 3C, and 3K are then developed by the developing modules 5Y, 5M, 5C, and 5K, respectively, and are transferred onto a transfer sheet conveyed on the conveyance belt 102 one after another, thereby forming a full-color image thereon. Subsequently, the fixing device 114 fixes the full-color image onto the transfer sheet. The pair of sheet ejection rollers 116 then ejects the transfer sheet onto the sheet ejection tray 116. Accordingly, the printing in the full-color mode is completed.

Now, a typical image processing section 200 included in the image forming apparatus as shown in FIG. 1 is described in detail.

The image processing section 200 includes a dither processing section 201 and a dither table 202. The image processing section 200 applies dither processing to image data inputted thereto. Subsequently, the image data having been subjected to dither processing is outputted to the semiconductor laser LD. The semiconductor laser LD then emits a prescribed light beam in accordance with the image data to the light deflector. Such a dither processing section 201 executes dither processing with reference to a dither pattern stored in the dither table 202.

Figure 3:
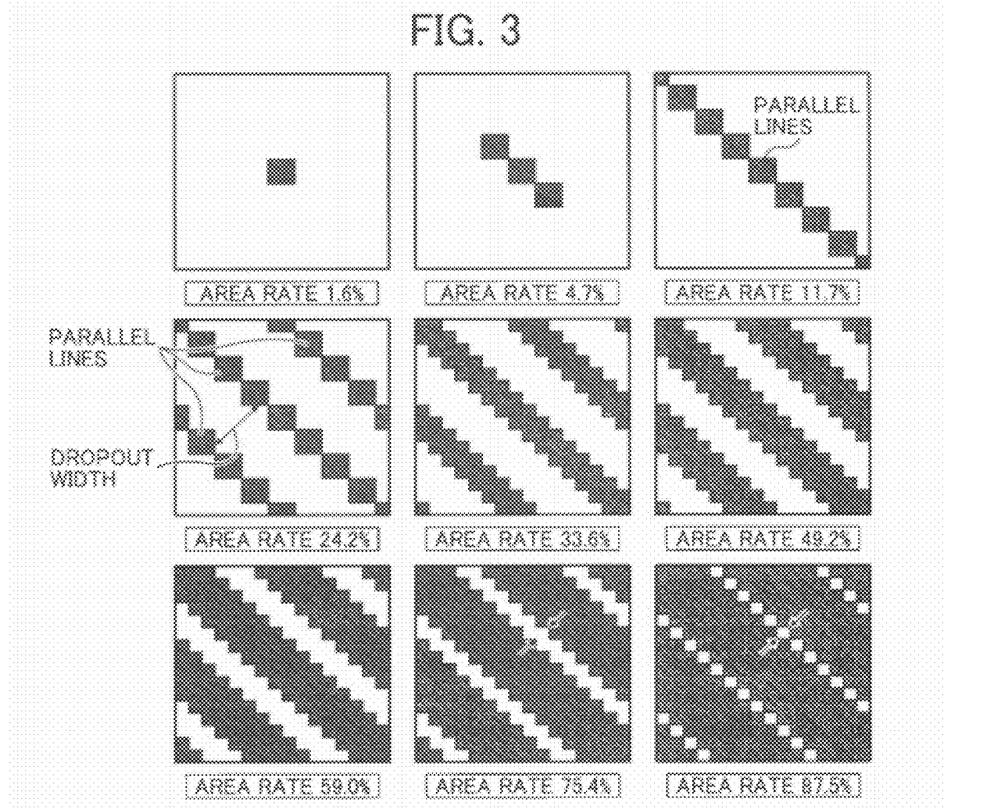
FIG. 3 typically illustrates conventional dither processing.

Now, a conventional dither processing is described with reference to FIG. 3 for the purpose of comparing it with various embodiments of the present invention. Specifically, a typical dot growing manner using a conventional dither processing is described with reference to FIG. 3.

Figure 4:
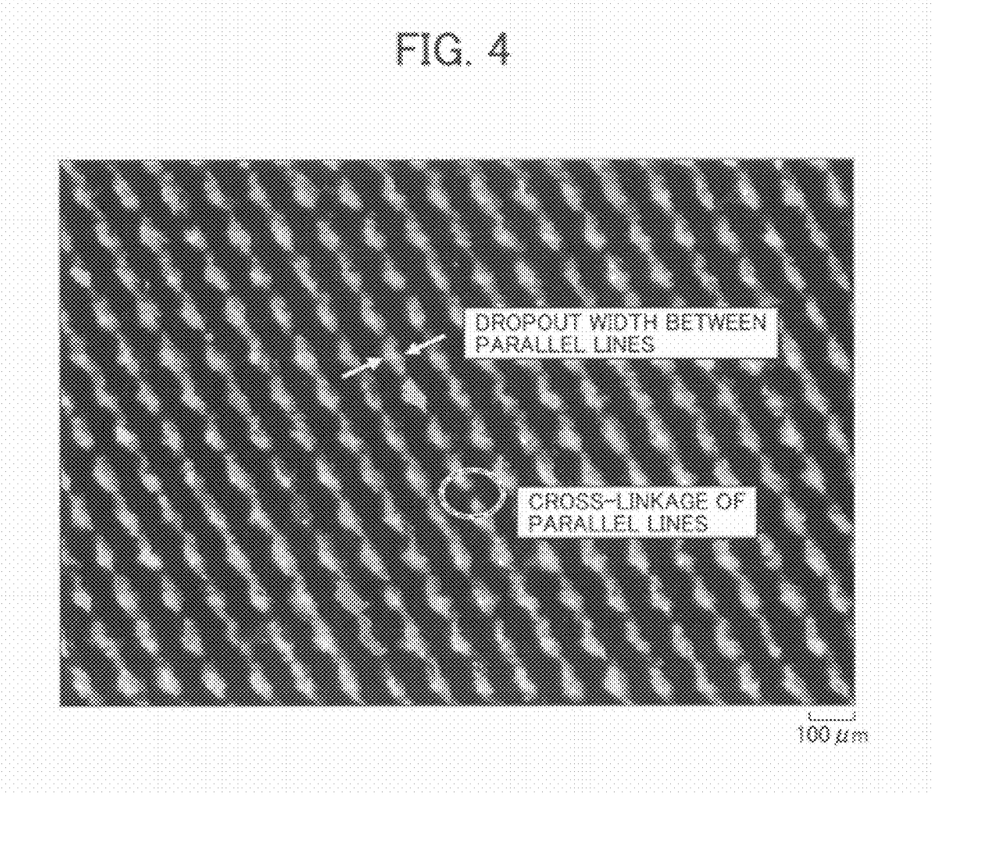
FIG. 4 illustrates a condition when cross-linkage of line screens with each other occurs.

As shown, with the dot growing method using the conventional dither processing, line screens monotonously grow up (i.e., without changing the number of line screens). Accordingly, when an area rate of image data inputted increases up to a prescribed high level, and accordingly an amount of toner attracted (onto an image) increases, an interval (i.e., a dropout width) between line screens becomes narrower. Specifically, hitherto, regardless of a level of the area rate of the inputted image data, the interval between the line screens is monotonously narrowed to increase density of the inputted image data. As a result, when the interval between the line screens narrows excessively, cross-linkage of the line screens is partially generated as shown in FIG. 4. Such cross-linkage appears on an irregular basis and is intermittent. Such irregular generation of the cross-linkage of the line screens causes uneven toner attraction condition, thereby disturbing color stability.

A dropout width between the line screens which likely generates the cross-linkage as shown in FIG. 4 depends on various factors, such as a writing speed of the light beam, a diameter of a beam spot of the light beam, etc. Accordingly, the dropout width between the line screens likely generating the cross-linkage varies with the type of apparatus.

Figure 5:
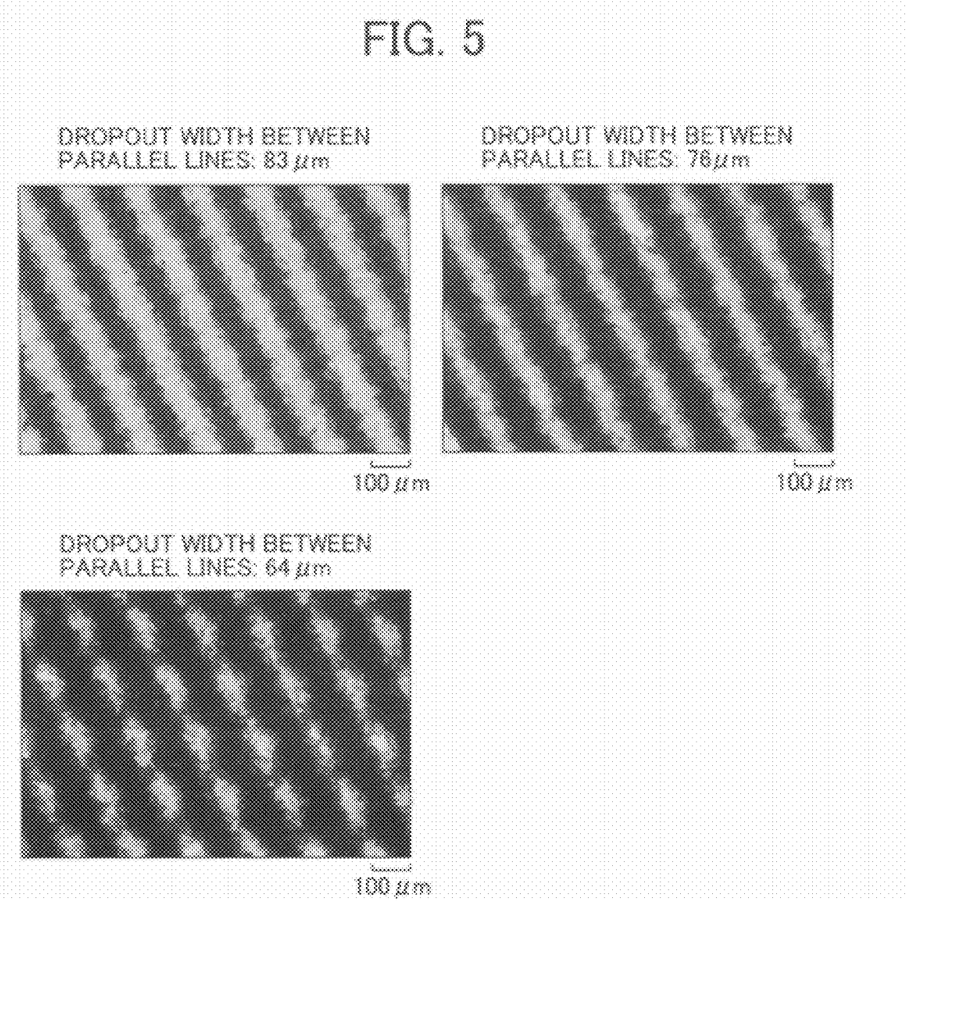
FIG. 5 illustrates a condition when the other cross-linkage of line screens with each other occurs.

A prescribed output image obtained from a typical model is described with reference to FIG. 5. As shown, when a dropout width between line screens is about 83 micrometers, cross-linkage does not occur. By contrast, when the dropout width of line screens is about 76 or about 64 micrometers, cross-linkage does occur. Thus, it is apparent that cross-linkage occurs between line screens at around 80 micrometers in the image outputted from the prescribed model. In this embodiment of the present invention, not to generate cross-linkage between line screens, the dropout width of the line screens is maintained to be greater than a prescribed level inherently determined in respective models. For this reason, this embodiment changes the number of line screens when the dropout width between line screens is equal to or less than a prescribed level. Dither processing of this embodiment is now described in detail with reference to FIGS. 6 and 7.

Figure 7:
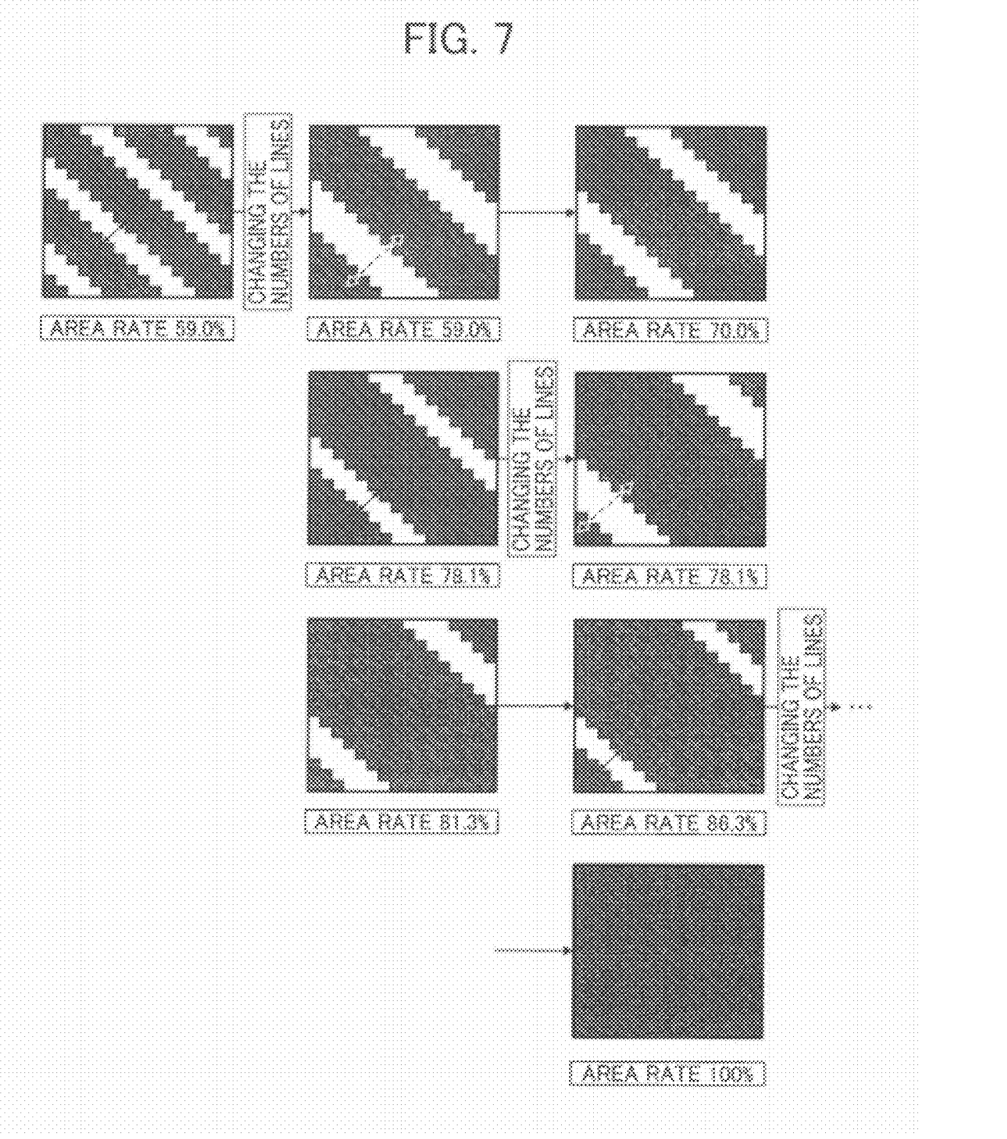
FIG. 7 typically illustrates a result of applying the dithering processing according to one embodiment of the present invention.

Now, typical dither processing of this embodiment is described more in detail with reference to FIGS. 6 and 7. When image data is inputted, a dither processing device detects an area rate of the inputted image data and applies line screen processing in accordance with the detection result. Then, the dither processing device calculates a dropout width between neighboring two of a prescribed number of line screens in step S1. In general, as the area rate increases, an amount of toner to be attracted increases and line screens become fatter, thereby narrowing the dropout width between neighboring two of the prescribed number of line screens.

Subsequently, it is determined by the dither processing device if the dropout width is equal to or less than a prescribed level in step S2. When the determination is positive (Yes, in step S2), a dither processor decreases the prescribe number of line screens until the dropout width exceeds the prescribed level or the number of line screens reaches the lower limit and recalculates a dropout width again in steps S3 to S6. When the dropout width as a result of recalculation exceeds the prescribed level after increasing in the number of line screens, writing data having the dropout width and the number of line screens is outputted to a semiconductor laser LD.

When the number of line screens becomes the prescribed lower limit (i.e., Yes, in step S4), an input image area rate (i.e., a halftone dot area rate) is increased without changing the number of line screens in accordance with the area rate of the input image data until the input area rate becomes 100% in step S5. The lower limit is an inherent value to a system and is previously obtained from experiment. Indeed, when the number of line screens becomes the lower limit, the cross-linkage occurs. However, since the area rate is high, and accordingly the image is dark enough, uneven toner attraction does not impact on image quality.

Hence, according to this embodiment, when the area rate of the input image data becomes a high level and the dropout width between the line screens becomes equal to or less than the prescribed level, the number of line screens is decreased to control the dropout width of the line screens to be greater than the prescribed level. Subsequently, the area rate of the input image data is increased again, and the number of line screens is decreased again to control the dropout width to be greater than the prescribed level when the dropout width of the line screens becomes equal to or less than the prescribed level. Hence, by repeating the above-described dither processing operations and thereby decreasing the number of line screens stepwise, the dropout width can always be maintained as greater than the prescribed level in this embodiment.

In an example of FIG. 7, since the dropout width of the line screens is equal to or less than the prescribed level when the area rate of the input image data is 59.0%, the number of line screens is decreased (i.e., the number of line screens is changed) to control the dropout width to be greater than the prescribed level. Subsequently, the area rate of the input image data is increased again to narrow the dropout width of the line screens. When the dropout width of the line screens becomes equal to or less than the prescribed level, the number of line screens is decreased again to control the dropout width to be greater than the prescribed level. Further, since the dropout width of the line screens, which is generated when the area rate of the input image data is 78.1%, is equal to or less than the prescribed level, the number of line screens is decreased (i.e., the number of line screens is changed as shown) to control the dropout width to be greater than the prescribed level. The above-described processing operations are repeated, and the number of line screens is decreased stepwise, and an input halftone dot area rate is monotonously increased until the area rate of the input image data becomes 100%. The processing is completed when the area rate of the input image data reaches 100%. Hence, the cross-linkage of the line screens of FIG. 4 and accordingly, the fluctuation in the amount of toner attracted onto an image can be minimized, thereby improving color stability.

Further, control of respective sections of the above-described image forming apparatus of this embodiment can be implemented as either a hardware or software. Yet, otherwise, a combination of the hardware and software (i.e., a hybrid type) can realize the control.

Specifically, when the above-described processing is implemented using software, program storing a processing sequence may be installed in a memory provided in a computer built in private use hardware. Otherwise, the program may be installed in a general-purpose computer capable of implementing various processing operations and is executed.

For example, the program may be previously recorded in a recording medium such as a Hard Disc (HD) and a Read Only Memory (ROM), etc. Yet otherwise, the program may temporarily or eternally be recorded or stored in a removable recording medium, such as a Floppy (TM) Disc, a Compact Disc, a Read Only Memory (CD-ROM), an Magnet optical (MO) disc, a Digital Versatile Disc (DVD), a magnetic Disc, a semiconductor memory, etc., provided as package software.

The program may be installed from the removable recording medium or is downloaded from a download site either wirelessly or via a wire to the computer.

Further, depending on its processing ability or upon need, the image forming apparatus can execute the above-described various processing operations separately or in parallel than executing those in chronological order as described above.

Numerous additional modifications and variations of the present invention are possible in light of the above teachings. It is therefore to be understood that within the scope of the appended claims, the present invention may be practiced otherwise than as specifically described herein.

What is claimed is:

1. An image processing apparatus comprising:
an input device;

a dither processing device to apply dither processing to input image data from the input device using line screen processing, said dither processing device calculating a dropout width between neighboring line screens after execution of the line screen processing in accordance with an area rate of the input image data, wherein said dither processing device decreases the number of line screens per unit area and maintains a prescribed minimum dropout width therebetween when the dropout width as a calculation result falls below a prescribed level, wherein said dither processing device stops decreasing the number of line screens at a prescribed lower limit.

2. The image processing apparatus as claimed in claim 1, wherein said prescribed level of the dropout width is a minimum level capable of substantially avoiding cross-linkage of the line screens on an image.

3. The image processing apparatus as claimed in claim 1, wherein said prescribed lower limit of the number of line screens representing a minimum image quality level.

4. The image processing apparatus as claimed in claim 1, further comprising:

an image formation device to form an image on an image bearer by emitting a light beam thereonto in accordance with image data obtained by applying the dither processing to the input image data; and a designating device to designate the prescribed minimum dropout width in accordance with one of a writing speed of the light beam and a spot diameter of the light beam.

5. The image processing apparatus as claimed in claim 1, wherein said dither processing device decreases the number of line screens by one at a time.

6. The image processing apparatus as claimed in claim 4, wherein the dither processing device recalculates the dropout width in accordance with the area rate of the input image data every time the number of line screens is decreased by one at a time.

7. A method of executing image data processing, comprising the steps of:

applying dither processing to input image data with line screen processing in accordance with an area rate of the input image data;

calculating a dropout width between the neighboring line screens in accordance with the area rate of the input image data based on the line screen processing;

decreasing the number of line screens per unit area to maintain a prescribed minimum dropout width between the neighboring line screens when the area rate of the input image data increases and the dropout width falls below a prescribed level;

recalculating a dropout width between the neighboring line screens in accordance with the area rate of the input image data based on the line screen processing;

outputting an image signal having a lower limit number of line screens when the dropout width exceeds the prescribed level;

designating the prescribed minimum dropout width in accordance with one of a writing speed of the light beam and a spot diameter of the light beam before the step of applying dither processing, and forming an image on an image bearer by emitting a light beam thereonto in accordance with image data obtained by applying the dither processing to the input image data.

8. A non-transitory computer program product comprising computer program codes that when executed by a computer causes the computer to perform the steps of:

applying dither processing to input image data with line screen processing in accordance with an area rate of the input image data;

calculating a dropout width between the neighboring line screens in accordance with the area rate of the input image data based on the line screen processing;

decreasing the number of line screens per unit area to maintain a prescribed minimum dropout width between the neighboring line screens when the area rate of the input image data increases and the dropout width falls below a prescribed level;

recalculating a dropout width between the neighboring line screens in accordance with the area rate of the input image data based on the line screen processing;

outputting an image signal having a lower limit number of line screens when the dropout width exceeds the prescribed level;

designating the prescribed minimum dropout width in accordance with one of a writing speed of the light beam and a spot diameter of the light beam before the step of applying dither processing, and forming an image on an image bearer by emitting a light beam thereonto in accordance with image data obtained by applying the dither processing to the input image data.

* * * * *